US012597398B2

United States Patent

(12) United States Patent
Deng
(10) Patent No.: US 12,597,398 B2
(45) Date of Patent: Apr. 7, 2026

(54) MINI-LED BACKLIGHT MODULE, DRIVING METHOD THEREOF, AND DISPLAY DEVICE THEREOF

(71) Applicants: HUIZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

(72) Inventor: Hongzhao Deng, Huizhou (CN)

(73) Assignees: HUIZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 25 days.

(21) Appl. No.: 18/557,945

(22) PCT Filed: May 30, 2023

(86) PCT No.: PCT/CN2023/097003
§ 371 (c)(1),
(2) Date: Jan. 30, 2025

(87) PCT Pub. No.: WO2024/234415
PCT Pub. Date: Nov. 21, 2024

(65) Prior Publication Data

US 2025/0166579 A1 May 22, 2025

(30) Foreign Application Priority Data

May 16, 2023 (CN) ........................ 202310551520.0

(51) Int. Cl.
*G09G 5/10* (2006.01)
*G09G 3/32* (2016.01)
*G09G 3/34* (2006.01)

(52) U.S. Cl.
CPC ............ *G09G 3/3426* (2013.01); *G09G 3/32* (2013.01); *G09G 2310/08* (2013.01); *G09G 2320/0233* (2013.01)

(58) Field of Classification Search
CPC .... G09G 3/3426; G09G 3/32; G09G 2310/08; G09G 2320/0233
(Continued)

(56) References Cited

U.S. PATENT DOCUMENTS

| | | | | |
|---|---|---|---|---|
| 2009/0066687 | A1 | 3/2009 | Oke | |
| 2011/0050760 | A1* | 3/2011 | Ito | G09G 3/3426 345/694 |

(Continued)

FOREIGN PATENT DOCUMENTS

| | | | |
|---|---|---|---|
| CN | 1955793 | A | 5/2007 |
| CN | 101123072 | A | 2/2008 |

(Continued)

OTHER PUBLICATIONS

International Search Report in International application No. PCT/CN2023/097003, mailed on Dec. 21, 2023.

(Continued)

*Primary Examiner* — Jennifer T Nguyen
(74) *Attorney, Agent, or Firm* — PV IP PC; Peter Stecher; Wei Te Chung

(57) ABSTRACT

The present application provides a mini-LED backlight module, a driving method thereof, and a display device thereof that dispose a plurality of scan line sets. Each of the scan line sets includes a number of M of scan lines. $i^{th}$ ones of the scan lines in the different ones of the scan line sets are
(Continued)

connected to one another, and the $i^{th}$ ones of the scan lines in the different ones of the scan line sets are connected to the $i^{th}$ ones of the mini-LED partitions of the backlight groups respectively. Therefore, a number of the source electrode chips is reduced, which drastically decreases a manufacturing cost of the mini-LED backlight module.

17 Claims, 5 Drawing Sheets

(58) Field of Classification Search
USPC .......................................................... 345/690
See application file for complete search history.

(56) References Cited

U.S. PATENT DOCUMENTS

| | | | | |
|---|---|---|---|---|
| 2013/0169190 | A1* | 7/2013 | Fujita | H05B 47/00 315/307 |
| 2020/0117050 | A1* | 4/2020 | Shao | G02F 1/133602 |
| 2020/0344856 | A1* | 10/2020 | Chen | G09G 3/3406 |
| 2022/0309997 | A1 | 9/2022 | Hu | |

FOREIGN PATENT DOCUMENTS

| | | | |
|---|---|---|---|
| CN | 103208250 | A | 7/2013 |
| CN | 108597458 | A | 9/2018 |
| CN | 109192151 | A | 1/2019 |
| CN | 111243496 | A | 6/2020 |
| CN | 111445867 | A | 7/2020 |
| CN | 113077762 | A | 7/2021 |
| CN | 114333714 | A | 4/2022 |
| JP | 2013171258 | A | 9/2013 |
| KR | 20070034381 | A | 3/2007 |

OTHER PUBLICATIONS

Written Opinion of the International Search Authority in International application No. PCT/CN2023/097003, mailed on Dec. 21, 2023.
Chinese Office Action issued in corresponding Chinese Patent Application No. 202310551520.0 dated Jul. 15, 2025, pp. 1-8.

* cited by examiner

MINI-LED BACKLIGHT MODULE, DRIVING METHOD THEREOF, AND DISPLAY DEVICE THEREOF

CROSS REFERENCE TO RELATED APPLICATIONS

This application claims the priority of International Application No. PCT/CN2023/097003, filed on May 30, 2023, which claims priority to Chinese Application No. 202310551520.0, filed on May 16, 2023. The entire disclosures of the above applications are incorporated herein by reference.

FIELD OF INVENTION

The present invention relates to a field of display technologies, especially to a mini-light emitting diode (mini-LED) backlight module, a driving method thereof, and a display device thereof.

BACKGROUND OF INVENTION

Different from a self-emissive nature of (organic light emitting diode) OLED display panels, liquid crystal display (LCD) panels require the assistance of a backlight source for illumination. The evolution of backlight sources can be roughly divided into three stages. In the first stage, the primary approach was edge-lit backlighting. During this stage, the light source consisted of LED large lamp beads arranged around the periphery of a light guide plate. Due to the necessity of using a light guide plate to evenly distribute light across all corners of the backlight, the solution suffered from low light efficiency, high energy consumption, poor uniformity, and low brightness. Subsequently, a second generation of backlight technology emerged—the "starry sky" backlight solution. Compared to the first generation edge-lit backlight, the second generation featured a direct-type backlight combined with uniformly dispersed LED lamp beads. This enhanced uniformity of light, improved light efficiency, yet the second generation backlight still exhibited a "full-on/full-off" characteristic, resulting in considerable unnecessary energy consumption. In recent years, the development of a third-generation mini-LED backlight solution has gained traction. In contrast to traditional edge-lit and direct-type backlights, the third generation employs precise control over the light source, enabling local dimming functionality. This not only significantly enhances LCD contrast but also reduces energy consumption, promoting energy efficiency and power conservation. As a result, it possesses competitive capabilities comparable to OLED display panels.

SUMMARY OF THE INVENTION

Currently, the more widely produced mini-light emitting diode (mini-LED) backlight products utilize printed circuit board (PCB) substrates. However, PCB substrates exhibit issues such as warping, expansion, limited scalability in size, and constrained line precision. In contrast, glass substrates offer advantages such as efficient heat dissipation, excellent flatness, and seamless integration, making them widely recognized in the industry as the future of the mini-LED sector. Nevertheless, due to technical challenges in perforating glass, the drive for glass substrates is relatively limited compared to PCB substrates. Presently, two commonly employed methods for driving glass substrates are thin-film transistor (TFT) driving and microchip (Micro IC) driving. However, TFT driving encounters problems with device drift, leading to lower manufacturing efficiency. Micro IC driving stands out as the most desirable mass production solution for glass-based mini-LEDs. Nonetheless, the significant consumption of Micro ICs and the associated higher costs serve as limiting factors for achieving large-scale manufacturing.

To solve the above issue, the embodiment of the present invention provides a mini-LED backlight module, a driving method, and a display device thereof making a mass production of mini-LEDs can be realized by glass substrates by improving a driving method for a mini-LED backlight module.

In a first aspect, the embodiment of the present invention provides a mini-LED backlight module, comprising:

- a substrate;
- a plurality of backlight groups distributed in an array on the substrate, wherein each of the backlight groups comprises a number of M of mini-LED partitions arranged vertically, and M is a positive integer greater than 1;
- a plurality of source electrode chips, wherein each of the source electrode chips is connected to a number of N of the backlight groups by output channels of a number of N connected correspondingly to the number of N of the backlight groups respectively, and N is a positive integer greater than 1; and
- a plurality of scan line sets, wherein each of the scan line sets comprises a number of M of scan lines, $i^{th}$ ones of the scan lines in different ones of the scan line sets are connected to one another, the $i^{th}$ ones of the scan lines in different ones of the scan line sets are connected correspondingly to $i^{th}$ ones of the mini-LED partitions in the backlight groups respectively, and $1 \le i \le M$.

In some embodiments, each of the output channels of each of the source electrode chips is divided into a number of M of output sub-channels, the source electrode chip is connected to the number of M of the mini-LED partitions in a corresponding one of the backlight groups by the number of M of the output sub-channels in the output channel connected correspondingly to the number of M of the mini-LED partitions respectively.

In some embodiments, each of the scan lines is connected to a first end of a corresponding one of the mini-LED partitions in each of the backlight partitions.

In some embodiments, the mini-LED backlight module further comprises power supply line, a power supply line connected to a second end of each of the mini-LED partitions in the backlight groups arranged vertically.

In some embodiments, the mini-LED backlight module further comprises a gate electrode chip connected to each of the scan lines.

In some embodiments, each of the mini-LED partitions comprises a plurality of light emitting elements arranged in an array, and input ends of the light emitting elements in each of the mini-LED partitions are connected to one another and are connected to corresponding ones of the output channels respectively.

In some embodiments, the substrate is a glass substrate.

In a second aspect, the embodiment of the present invention provides a mini-LED backlight module driving method for the above mini-LED backlight module, and the driving method comprises:

simultaneously scanning the $i^{th}$ ones of the mini-LED partitions in the backlight groups by the $i^{th}$ ones of the scan lines of the scan line sets corresponding to the $i^{th}$ ones of the mini-LED partitions, and driving the $i^{th}$ ones of the mini-LED partitions in the number of N of the backlight groups by source electrode chips corresponding to the $i^{th}$ ones of the mini-LED partitions, and 1≤i≤M.

In some embodiments, before the step of simultaneously scanning the $i^{th}$ ones of the mini-LED partitions in the backlight groups by the $i^{th}$ ones of the scan lines of the scan line sets corresponding to the $i^{th}$ ones of the mini-LED partitions, the driving method further comprises:

- inputting an effective level to the $i^{th}$ ones of the scan lines of the scan line sets by a gate electrode chip, and switching on the $i^{th}$ ones of the mini-LED partitions in the backlight groups based on a high electric potential provided by a power supply line and the effective level.

In some embodiments, the driving method uses an active driving method.

In a third aspect, the embodiment of the present invention further provides a display device, comprising a display panel and a mini-LED backlight module, wherein the mini-LED backlight module is configured to provide a backlight source for the display panel, and the mini-LED backlight module comprises:

- a substrate;
- a plurality of backlight groups distributed in an array on the substrate, wherein each of the backlight groups comprises a number of M of mini-LED partitions arranged vertically, and M is a positive integer greater than 1;
- a plurality of source electrode chips, wherein each of the source electrode chips is connected to a number of N of the backlight groups by output channels of a number of N connected correspondingly to the number of N of the backlight groups respectively, and N is a positive integer greater than 1; and
- a plurality of scan line sets, wherein each of the scan line sets comprises a number of M of scan lines, $i^{th}$ ones of the scan lines in different ones of the scan line sets are connected to one another, the $i^{th}$ ones of the scan lines in different ones of the scan line sets are connected correspondingly to $i^{th}$ ones of the mini-LED partitions in the backlight groups respectively, and 1≤i≤M.

In some embodiments, each of the output channels of each of the source electrode chips is divided into a number of M of output sub-channels, the source electrode chip is connected to the number of M of the mini-LED partitions in a corresponding one of the backlight groups by the number of M of the output sub-channels in the output channel connected correspondingly to the number of M of the mini-LED partitions respectively.

In some embodiments, each of the scan lines is connected to a first end of a corresponding one of the mini-LED partitions in each of the backlight partitions.

In some embodiments, the mini-LED backlight module further comprises a power supply line connected to a second end of each of the mini-LED partitions in the backlight groups arranged vertically.

In some embodiments, the mini-LED backlight module further comprises a gate electrode chip connected to each of the scan lines.

In some embodiments, each of the mini-LED partitions comprises a plurality of light emitting elements arranged in an array, and input ends of the light emitting elements in each of the mini-LED partitions are connected to one another and are connected to corresponding ones of the output channels respectively.

In some embodiments, the substrate is a glass substrate.

Advantages

Compared to a conventional source electrode chips having each output channel only able to control one mini-LED partitions, the mini-LED backlight module provided by the embodiment of the present invention, the driving method thereof, and the display device thereof disposing a plurality of scan line sets. Each of the scan line sets comprises a number of M of scan lines, $i^{th}$ ones of the scan lines in different ones of the scan line sets (1≤i≤M) are connected to one another, and the $i^{th}$ ones of the scan lines in the different ones of the scan line sets are connected to $i^{th}$ ones of the mini-LED partitions in backlight groups respectively. As such, by simultaneously scanning the corresponding $i^{th}$ ones of the scan lines within the scan line sets, the $i^{th}$ ones of the mini-LED partitions in the backlight groups are scanned. Furthermore, the corresponding $i^{th}$ mini-LED partitions in the backlight groups of the numbered of N, are driven through source electrode chips. This, in turn, enhances the control range and driving capability of the source electrode chips, while maintaining the independent control of each mini-LED partition. This approach allows for a reduction in the number of source electrode chips to 1/N of the conventional chips, resulting in a significant decrease in the manufacturing cost of the mini-LED backlight module. The method is suitable for the rapid mass production of mini-LED backlight modules and mini-LED display panels that utilize glass substrates.

DETAILED DESCRIPTION OF PREFERRED EMBODIMENTS

To make the objective, the technical solution, and the effect of the present application clearer and more explicit, the present application will be further described in detail below with reference to the accompanying drawings. It should be understood that the specific embodiments described here are only used to explain the present application instead of being used to limit the present application.

Figure 1:
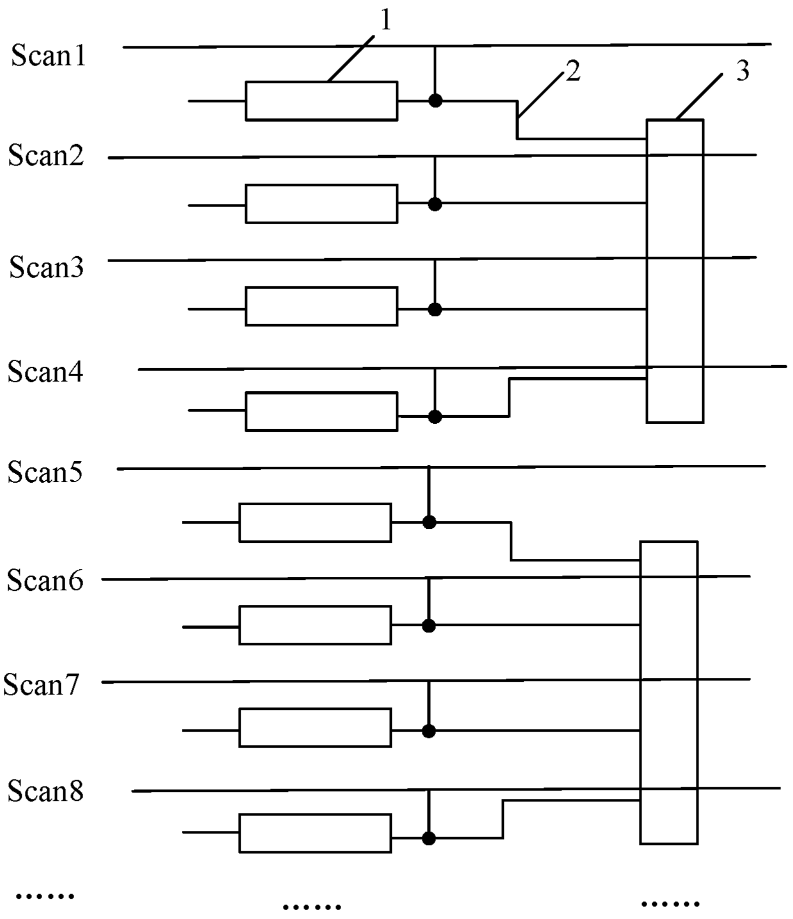
FIG. 1 PRIOR ART
FIG. 1 is a schematic driving structural view of a conventional mini-LED backlight module.

In a conventional mini-LED backlight module, one output channel of a source electrode chip, generally, is only configured to control one mini-LED partition. FIG. 1 is a schematic driving structural view of a conventional mini-LED backlight module. As shown in FIG. 1, the scan lines Scan arranged sequentially switch on a plurality of mini-LED partitions 1 in turn. When one of the scan lines Scan switch on one mini-LED partition 1, the source electrode chip 3 lights up the mini-LED partition 1 through one output channel 2. As such, the source electrode chips 3 can only determine an upper limit of an amount of the min LED partitions able to be driven according to a number of the output channels 2, resulting in a greater amount of the source electrode chips 3 required, a higher cost of mini-LED backlight modules, and thereby limiting the mass production of the mini-LED display panel.

Figure 2:
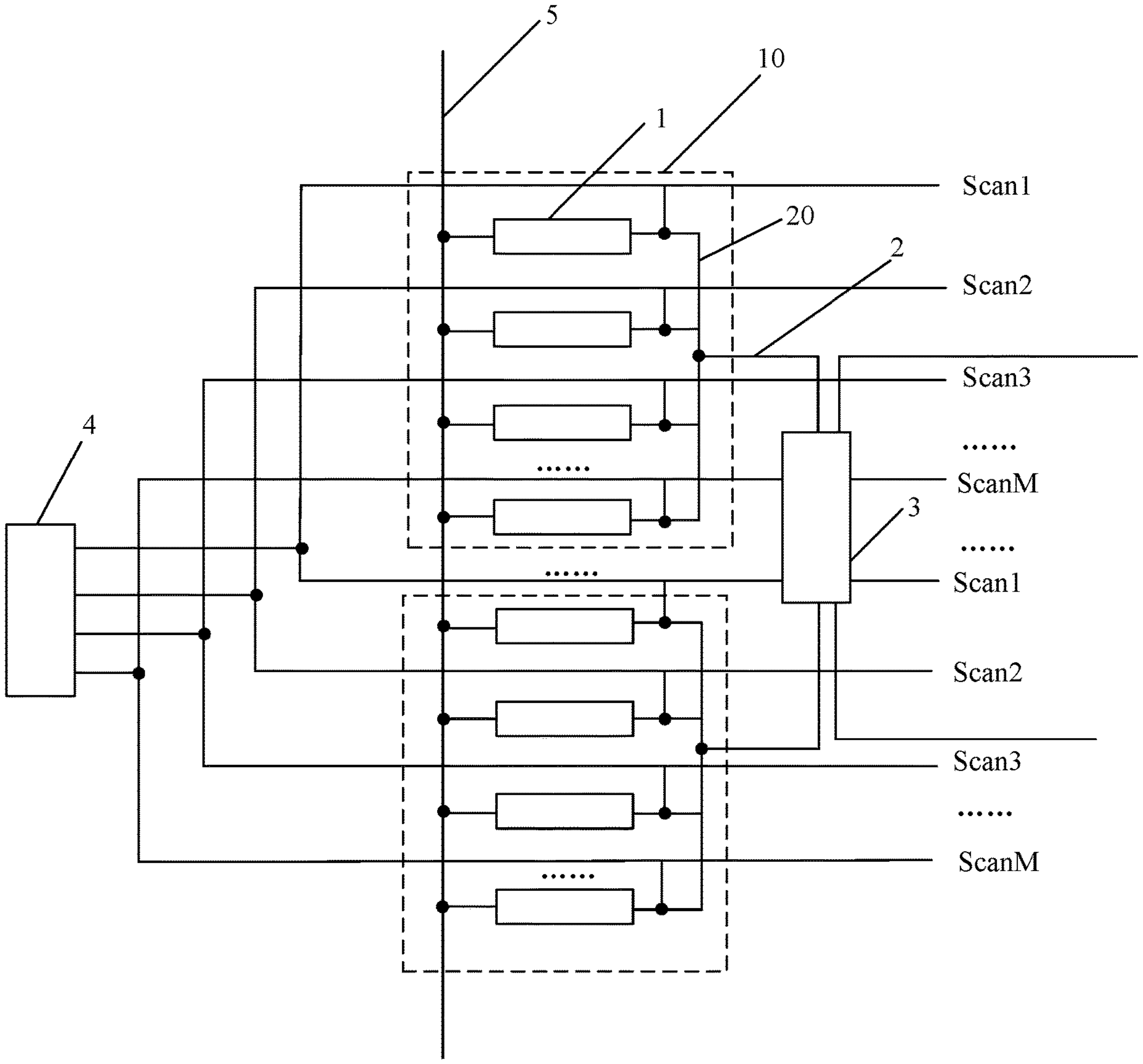
FIG. 2 is a schematic driving structural view of a mini-LED backlight module provided by the embodiment of the present invention.

FIG. 2 is a schematic driving structural view of the mini-LED backlight module provided by the embodiment of the present invention. As shown in FIG. 2, the embodiment of the present invention provides a mini-LED backlight module, comprising:

a substrate (not shown in the figures);

a plurality of backlight groups 10 distributed in an array on the substrate, wherein each of the backlight groups 10 comprises a number of M of mini-LED partitions 1 arranged vertically, M is a positive integer greater than 1;

a plurality of source electrode chips 3, wherein each of the source electrode chips 3 is connected to a number of N of the backlight groups 10 by a number of N of output channels 2 connected correspondingly to the number of N of the backlight groups 10 respectively, and N is a positive integer greater than 1;

a plurality of scan line sets, wherein each of the scan line sets comprises a number of M of scan lines Scan1, Scan2, Scan3 . . . ScanM, $i^{th}$ ones of the scan lines in different ones of the scan line sets are connected to one another, and the $i^{th}$ ones of the scan lines in different ones of the scan line sets are connected to the $i^{th}$ ones of the mini-LED partitions 1 in the backlight groups 10 respectively, and $1 \le i \le M$.

It should be explained that wherein the $i^{th}$ ones of the scan lines in the different ones of the scan line sets connected to one another can be understood that one scan line is bent into a number of M of rows connected together, and each row serves as an independent scan line of an $i^{th}$ row to be connected to the $i^{th}$ one of the mini-LED partitions in a corresponding one of the backlight groups 10 and is configured to scan the $i^{th}$ one of the mini-LED partitions in the corresponding one of the backlight groups 10.

In the mini-LED backlight module of the embodiment of the present invention, a plurality of scan line sets are disposed. Each of the scan line sets comprises a number of M of scan lines, and $i^{th}$ ones of the scan lines in different ones of the scan line sets ($1 \le i \le M$) are connected to one another. Also, the $i^{th}$ ones of the scan lines in the different ones of the scan line sets are connected to the $i^{th}$ ones of the mini-LED partitions in each of the backlight groups 10 respectively. As such, by the $i^{th}$ ones of the scan lines in different ones of the scan line sets simultaneously scanning the corresponding $i^{th}$ ones of the mini-LED partitions 1 in the backlight groups 10, and by the source electrode chips 3 driving the corresponding $i^{th}$ ones of the mini-LED partitions 1 of the number of N of the number of N of the backlight groups 10, control range and driving capability of the source electrode chips 3 are improved without affecting independent control of each of the mini-LED partitions 1. This approach allows for a reduction in the number of source electrode chips 3 to 1/N of the conventional chips, resulting in a significant decrease in the manufacturing cost of the mini-LED backlight module. The method is suitable for the rapid mass production of mini-LED backlight modules and mini-LED display panels that utilize glass substrates.

In some embodiments, with reference to FIG. 2, each of the output channels 2 of each of the source electrode chips 3 is divided into a number of M of output sub-channels 20. Each of the source electrode chips 3 is connected to the number of M of the mini-LED partitions 1 in a corresponding one of the backlight groups 10 by the number of M of the output sub-channels 20 in the output channels 2 connected correspondingly to the number of M of the mini-LED partitions 1 respectively.

It should be explained that wherein the source electrode chip 3 is connected to one of the backlight groups 10 through the same output channel 2. In particular, the source electrode chip 3 is connected to a number of M of the mini-LED partitions in the backlight group 10 by a number of M of output sub-channels 20 divided from one output channel 2 connected correspondingly to the number of M of the mini-LED partitions in the backlight group 10 such that one output channel 2 can control the number of M of the mini-LED partitions to increase the driving capability of the source electrode chips 3, reduce the number of the source electrode chips 3, and lower the manufacturing cost of the mini-LED backlight module.

In some embodiments, with reference to FIG. 2, each of the scan lines Scan is connected to a first ends of a corresponding one of the mini-LED partitions in each of the backlight partitions 10.

In some embodiments, with reference to FIG. 2, the mini-LED backlight module further comprises a power supply line 5. The power supply line 5 is connected to a second end of each of the mini-LED partitions 1 in the backlight groups arranged vertically 10.

In some embodiments, with reference to FIG. 2, the mini-LED backlight module further comprises a gate electrode chip 4. The gate electrode chip 4 is connected to each of the scan lines Scan.

In some embodiments, each of the mini-LED partitions comprises a plurality of light emitting elements (not shown in the figures) arranged in an array, and input ends of the light emitting elements in each of the mini-LED partitions 1 are connected to one another as first ends of the backlight groups 10 in which the mini-LED partitions 1 are located and are connected to corresponding ones of the output channels 2 respectively.

In some embodiments, the substrate is a glass substrate, namely, the mini-LED backlight module is suitable for rapid mass production of mini-LED backlight modules adopting glass substrates.

Figure 3:
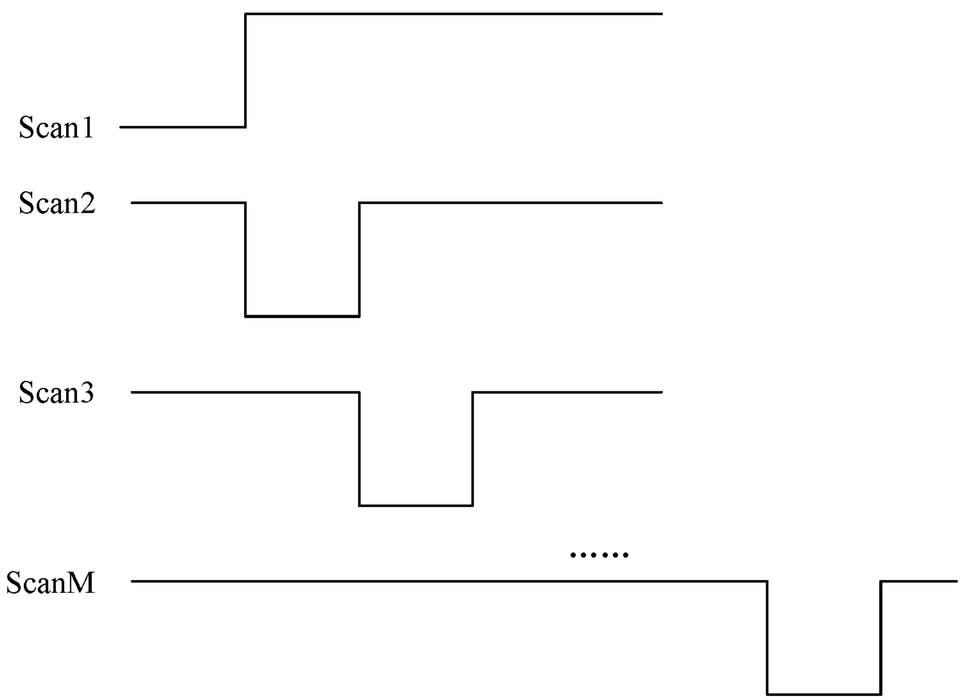
FIG. 3 is a drive timing diagram of the mini-LED backlight module provided by the embodiment of the present invention.

Based on the above embodiment, FIG. 3 is a drive timing diagram of the mini-LED backlight module provided by the embodiment of the present invention. With reference to FIGS. 2 and 3, the embodiment of the present invention provides a mini-LED backlight module driving method for the mini-LED backlight module as above. The driving method comprises:

simultaneously scanning the $i^{th}$ ones of the mini-LED partitions 1 in the backlight groups 10 by the $i^{th}$ ones of the scan lines of the scan line sets corresponding to the $i^{th}$ ones of the mini-LED partitions 1, and driving the $i^{th}$ ones of the mini-LED partitions 1 of the number of N of the backlight groups 10 by the source electrode chips 3 corresponding to the $i^{th}$ ones of the mini-LED partitions 1, and $1 \le i \le M$.

The mini-LED backlight module provided by the embodiment of the present invention driving method simultaneously scans the $i^{th}$ ones of the mini-LED partitions 1 in the backlight groups 10 by the $i^{th}$ ones of the scan lines of the scan line sets corresponding to the $i^{th}$ ones of the mini-LED partitions 1, and drives the $i^{th}$ ones of the mini-LED partitions 1 of the number of N of the backlight groups 10 by the source electrode chips 3 corresponding to the $i^{th}$ ones of the mini-LED partitions 1 such that control range and driving capability of the source electrode chips 3 are improved without affecting independent control of each of the mini- LED partitions. As such, the number of the source electrode chips 3 can be reduced to 1/N of the conventional chips, resulting in a significant decrease in the manufacturing cost of the mini-LED backlight module. The method is suitable for the rapid mass production of mini-LED backlight modules and mini-LED display panels that utilize glass substrates.

In some embodiments, before simultaneously scanning the $i^{th}$ ones of the mini-LED partitions 1 in the backlight groups 10 by the $i^{th}$ ones of the scan lines of the scan line sets corresponding to the $i^{th}$ ones of the mini-LED partitions 1, the driving method further comprises: inputting an effective level to the $i^{th}$ ones of the scan lines of the scan line sets by a gate electrode chip 4, and switching on the $i^{th}$ ones of the mini-LED partitions in the backlight groups based on a high electric potential provided by a power supply line 5 and the effective level.

It can be understood that when an electric potential difference between two ends of the mini-LED is greater than or equal to a switching voltage on the mini-LED, the mini-LED switches on, and the source electrode chips 3 can input data to and drive the mini-LED to emit light. When the electric potential difference between the two ends of the mini-LED is less than the switching voltage on the mini-LED, the mini-LED switches off, the source electrode chips 3 cannot input data to the mini-LED, and the mini-LED does not emit light.

In particular, the gate electrode chip 4 inputs into an effective level the first end of the mini-LED by the scan line, and the power supply line 5 inputs a high electric potential into a second end of the mini-LED. When the effective level is a low electric potential, the electric potential difference between the two ends of the mini-LED is greater than or equal to the switching voltage on the mini-LED, the mini-LED switches on, and the source electrode chips 3 can input data in and drive the mini-LED to emit light. When the effective level is a high electric potential, the electric potential difference between the two ends of the mini-LED is less than the switching voltage on the mini-LED, the source electrode chips 3 cannot input data in the mini-LED, and the mini-LED is in a switch-off state and does not emit light.

Figure 4:
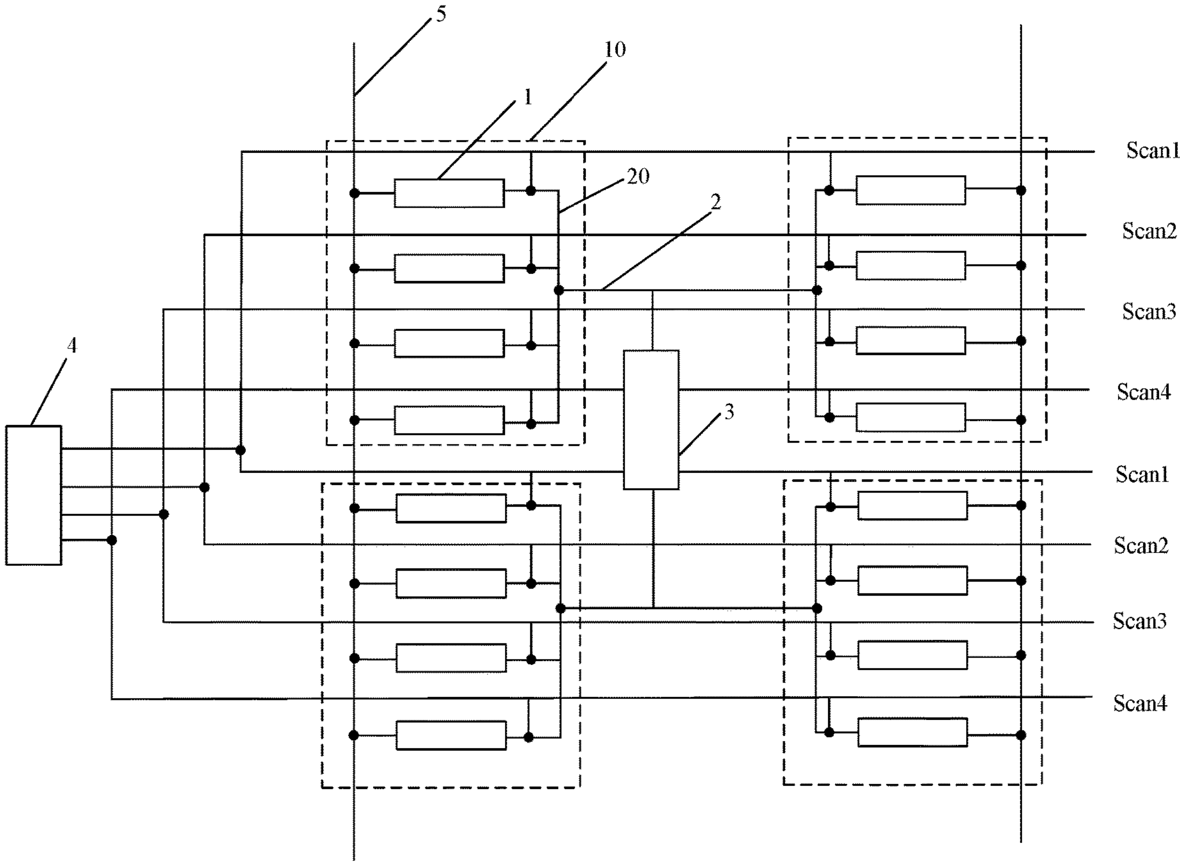
FIG. 4 is a schematic specific driving structural view of the mini-LED backlight module provided by the embodiment of the present invention.
Figure 5:
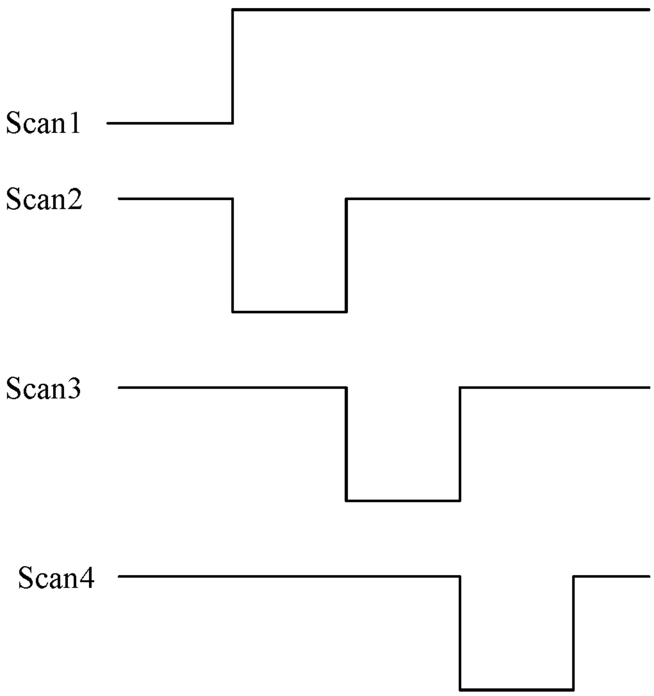
FIG. 5 is a specific drive timing diagram of the mini-LED backlight module provided by the embodiment of the present invention.

Based on the above embodiment, FIG. 4 is a schematic specific driving structural view of the mini-LED backlight module provided by the embodiment of the present invention, and FIG. 5 is a specific drive timing diagram of the mini-LED backlight module provided by the embodiment of the present invention. With reference to FIGS. 4 and 5, for example, M=4, N=4, each of the source electrode chips 3 is configured to control four of the backlight groups 10. Each of the backlight groups 10 comprises four of the mini-LED partitions 1 arranged vertically, each of the scan line sets comprises four scan lines Scan1, Scan2, Scan3, Scan4. The scan line Scan1 is connected to a first one of the mini-LED partitions in each of the backlight groups 10. The scan line Scan2 is connected to a second one of the mini-LED partitions in each of the backlight groups 10. The scan line Scan3 is connected to a third one of the mini-LED partitions in each of the backlight groups 10. The scan line Scan4 is connected to a fourth one of the mini-LED partitions in each of the backlight groups 10. The source electrode chip 3 is connected to four mini-LED partitions in the backlight groups 10 by four output sub-channels 20 divided from each of the output channels 2 corresponding to the mini-LED partitions.

When the gate electrode chip 4 inputs a low level in the scan line Scan1, a first end of the first one of the mini-LED partitions in each of the backlight groups 10 is a low level. The first one of the mini-LED partitions in each of the backlight groups 10 switches on. The source electrode chips 3 input data into the first ones of the mini-LEDs in four of the backlight groups 10 to drive the first mini-LEDs in the four backlight groups 10 to emit light, and so on such that the second, third, or fourth mini-LEDs in the four backlight groups 10 can emit light.

Accordingly, compared to the conventional source electrode chip 3 having one output channel 2 that can only control one mini-LED partition, one output channel 2 of the source electrode chip 3 of the mini-LED backlight module can control four mini-LED partitions respectively by four output sub-channels 20 such that control range and driving capability of the source electrode chips 3 increase four times. Also, the number of the source electrode chips 3 is reduced as one-fourth of the conventional chips, which drastically lowers the manufacturing cost of the mini-LED backlight module.

Based on the above embodiment, the embodiment of the present invention also provides a display device, comprising a display panel and the mini-LED backlight module as described above. The mini-LED backlight module is configured to provide the display panel with a backlight source. Because each embodiment above has described the mini-LED backlight module in detail, here is no repeated description.

It can be understood that for a person of ordinary skill in the art, equivalent replacements or changes can be made according to the technical solution of the present application and its inventive concept, and all these changes or replacements should belong to the scope of protection of the appended claims of the present application.

What is claimed is:

1. A mini-light emitting diode (mini-LED) backlight module, comprising:

a substrate;

a plurality of backlight groups distributed in an array on the substrate, wherein each of the backlight groups comprises a number of M of mini-LED partitions arranged vertically, and M is an integer greater than 1;

a plurality of source electrode chips, wherein each of the source electrode chips is connected to a number of N of the backlight groups by output the number of N of channels connected correspondingly to the number of N of the backlight groups respectively, and N is an integer greater than 1; and a plurality of scan line sets, wherein each of the scan line sets comprises a number of M of scan lines, $i^{th}$ ones of the scan lines in different ones of the scan line sets are connected to one another, the $i^{th}$ ones of the scan lines in different ones of the scan line sets are connected correspondingly to $i^{th}$ ones of the mini-LED partitions in the backlight groups respectively through branches lines each of which extends from one of the $i^{th}$ ones of the scan lines in different ones of the scan line sets, and $1 \leq i \leq M$.

2. The mini-LED backlight module according to claim 1, wherein each of the output channels of each of the source electrode chips is divided into a number of M of output sub-channels, the source electrode chip is connected to the number of M of the mini-LED partitions in a corresponding one of the backlight groups by the number of M of the output sub-channels in the output channel connected correspondingly to the number of M of the mini-LED partitions respectively.

3. The mini-LED backlight module according to claim 1, wherein each of the scan lines is connected to a first end of a corresponding one of the mini-LED partitions in each of the backlight partitions.

4. The mini-LED backlight module according to claim 3, further comprising a power supply line connected to a second end of each of the mini-LED partitions in the backlight groups arranged vertically.

5. The mini-LED backlight module according to claim 1, further comprising a gate electrode chip connected to each of the scan lines.

6. The mini-LED backlight module according to claim 1, wherein each of the mini-LED partitions comprises a plurality of light emitting elements arranged in an array, and input ends of the light emitting elements in each of the mini-LED partitions are connected to one another and are connected to corresponding ones of the output channels respectively.

7. The mini-LED backlight module according to claim 1, wherein the substrate is a glass substrate.

8. A mini-light emitting diode (mini-LED) backlight module driving method, for the mini-LED backlight module of claim 1, wherein the driving method comprises:

simultaneously scanning the $i^{th}$ ones of the mini-LED partitions in the backlight groups by the $i^{th}$ ones of the scan lines of the scan line sets corresponding to the $i^{th}$ ones of the mini-LED partitions, and driving the $i^{th}$ ones of the mini-LED partitions in the number of N of the backlight groups by source electrode chips corresponding to the $i^{th}$ ones of the mini-LED partitions, and $1 \leq i \leq M$.

9. The mini-LED backlight module driving method according to claim 8, wherein before the step of simultaneously scanning the $i^{th}$ ones of the mini-LED partitions in the backlight groups by the $i^{th}$ ones of the scan lines of the scan line sets corresponding to the $i^{th}$ ones of the mini-LED partitions, the driving method further comprises:

inputting an effective level to the $i^{th}$ ones of the scan lines of the scan line sets by a gate electrode chip, and switching on the $i^{th}$ ones of the mini-LED partitions in the backlight groups based on a high electric potential provided by a power supply line and the effective level.

10. The mini-LED backlight module driving method according to claim 8, wherein the driving method uses an active driving method.

11. A display device, comprising a display panel and a mini-light emitting diode (mini-LED) backlight module, wherein the mini-LED backlight module is configured to provide a backlight source for the display panel, and the mini-LED backlight module comprises:

a substrate;

a plurality of backlight groups distributed in an array on the substrate, wherein each of the backlight groups comprises a number of M of mini-LED partitions arranged vertically, and M is a positive integer greater than 1;

a plurality of source electrode chips, wherein each of the source electrode chips is connected to a number of N of the backlight groups by a number of N of output channels connected correspondingly to the number of N of the backlight groups respectively, and N is a positive integer greater than 1; and a plurality of scan line sets, wherein each of the scan line sets comprises a number of M of scan lines, $i^{th}$ ones of the scan lines in different ones of the scan line sets are connected to one another, the $i^{th}$ ones of the scan lines in different ones of the scan line sets are connected correspondingly to $i^{th}$ ones of the mini-LED partitions in the backlight groups respectively through branches lines each of which extends from one of the $i^{th}$ ones of the scan lines in different ones of the scan line sets, and $1 \leq i \leq M$.

12. The display device according to claim 11, wherein each of the output channels of each of the source electrode chips is divided into a number of M of output sub-channels, the source electrode chip is connected to the number of M of the mini-LED partitions in a corresponding one of the backlight groups by the number of M of the output sub-channels in the output channel connected correspondingly to the number of M of the mini-LED partitions respectively.

13. The display device according to claim 11, wherein each of the scan lines is connected to a first end of a corresponding one of the mini-LED partitions in each of the backlight partitions.

14. The display device according to claim 11, wherein the mini-LED backlight module further comprises a power supply line connected to a second end of each of the mini-LED partitions in the backlight groups arranged vertically.

15. The display device according to claim 11, wherein the mini-LED backlight module further comprises a gate electrode chip connected to each of the scan lines.

16. The display device according to claim 11, wherein each of the mini-LED partitions comprises a plurality of light emitting elements arranged in an array, and input ends of the light emitting elements in each of the mini-LED partitions are connected to one another and are connected to corresponding ones of the output channels respectively.

17. The display device according to claim 11, wherein the substrate is a glass substrate.

* * * * *